United States Patent [19]

Cunningham et al.

[11] Patent Number: 4,468,556
[45] Date of Patent: Aug. 28, 1984

[54] ELECTRIC HEATING ELEMENTS

[75] Inventors: Donald M. Cunningham, Pittsburgh; John C. Stover, Verona, both of Pa.

[73] Assignee: Emerson Electric Co., St. Louis, Mo.

[21] Appl. No.: 406,351

[22] Filed: Aug. 9, 1982

[51] Int. Cl.³ .............................................. H05B 3/06
[52] U.S. Cl. ...................... 219/523; 29/615;
174/103; 219/437; 219/537; 219/534; 219/544;
338/239; 338/242
[58] Field of Search .................. 29/611, 615, 617;
219/335, 426, 523, 535, 544, 540, 541, 552, 553,
534, 537, 539, 316, 320, 321, 466; 338/238, 239,
240, 242, 241, 248, 252, 256, 257, 261; 174/102
P, 103

[56] References Cited

U.S. PATENT DOCUMENTS

| 573,176 | 12/1896 | Borel | 174/102 P |
|---|---|---|---|
| 1,359,400 | 11/1920 | Lightfoot | 29/615 |
| 2,085,772 | 7/1937 | Soverhill | 338/238 X |
| 2,360,266 | 10/1944 | Osterheld | 338/244 |
| 2,362,152 | 11/1944 | Osterheld | 338/245 |
| 2,368,771 | 2/1945 | Osterheld | 338/245 |
| 2,600,605 | 6/1952 | Backer | 219/466 |
| 3,229,358 | 1/1966 | Scadron et al. | 29/615 |
| 3,305,820 | 2/1967 | Lennox | 338/240 |
| 3,340,382 | 9/1967 | Lennox | 219/544 |
| 3,468,023 | 9/1969 | McOrlly | 29/615 |
| 3,632,977 | 1/1972 | Takayasu | 219/335 |
| 3,719,799 | 3/1973 | Takayasu | 219/535 |
| 3,908,531 | 9/1975 | Morley | 99/336 |
| 4,319,127 | 3/1982 | Lindstrom et al. | 219/523 |
| 4,349,727 | 9/1982 | Churchill | 219/544 |

FOREIGN PATENT DOCUMENTS

| 2723640 | 11/1978 | Fed. Rep. of Germany | 238/238 |
|---|---|---|---|
| 562997 | 2/1944 | United Kingdom | 219/437 |
| 683029 | 11/1952 | United Kingdom | 338/242 |
| 710416 | 6/1954 | United Kingdom | 29/617 |

Primary Examiner—Volodymyr Y. Mayewsky
Attorney, Agent, or Firm—Michael Williams

[57] ABSTRACT

The electric heater herein disclosed is particularly adapted to heat a fluid and to provide a broad, substantially flat heater surface exposed to the fluid to be heated. The heating element is well adapted for deep fat frying use in that it is of high voltage and is economical to manufacture. The invention makes use of standard elongated, tubular, metal-sheathed heaters which are produced in large quantities for a multitude of uses. Such elements are slid into a metal tube of selected diameter and wall thickness, and the assembly is flat-pressed in appropriate sections with the ends round for termination with such fittings as are required. The assembly may then be bent to produce a desired configuration.

9 Claims, 8 Drawing Figures

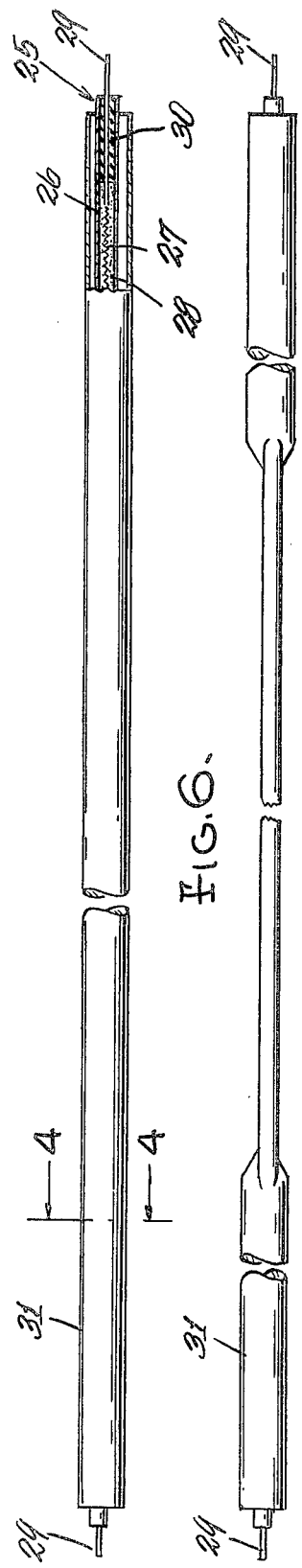
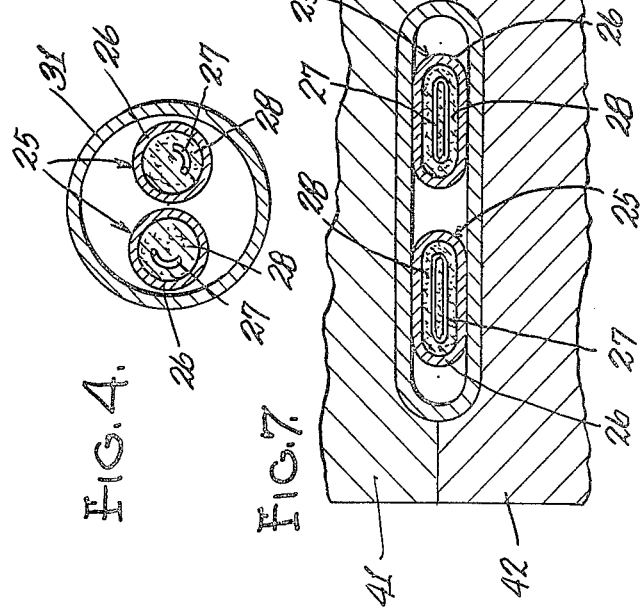

4,468,556

ELECTRIC HEATING ELEMENTS

BACKGROUND AND SUMMARY

French fryers in common use employ tubular, metal-sheathed electric heating elements, such as of the type shown in U.S. Pat. No. 3,908,531, issued to Fred W. Morley on Sept. 30, 1975. Contact of the oil with the round cross-sectioned sheath is limited and therefore more time was required to bring the oil up to frying temperature.

In an attempt to increase the surface contact with the oil, strip heaters were used, but where the insulation within the heater was mica, wattage was limited because mica cannot withstand the high heat required in deep fat frying.

Strip heaters are also available wherein the insulation is compacted, granular material, such as disclosed in U.S. Pat. No. 1,614,330, issued Jan. 11, 1927, to Edwin L. Wiegand. Although the wattage problem was reduced with this type of heater, the assembly of a plurality of these strip heaters to provide side-by-side heating portions and upright terminal portions represented a substantial and costly assembly.

Our invention eliminates the problems of the prior art, as noted above, and provides a heater capable of high wattage, low manufacturing cost and with substantial surface contact with the liquid to be heated. The low cost is achieved by use of standard tubular, metal-sheathed heaters which are produced in large quantities for a multitude of uses, such as for surface, broiler and bake elements in an electric range; immersion heaters of various types; circulation heaters; and many other uses.

According to our invention, two or more standard tubular, metal-sheathed heaters are slid into an empty metal tube having a selected interior diameter, wall thickness and length. The assembly is then flat-pressed in the appropriate longitudinal places therealong, and the pressed heater is then bent to produce a shape required by a user.

DESCRIPTION OF THE DRAWINGS

In the drawings accompanying this specification and forming a part of this application, there is shown, for purpose of illustration, an embodiment which our invention may assume, and in these drawings:

FIG. 3 is a broken, elevational view, partly in section, showing an assembly of two standard tubular heaters, within a metal tube, FIG. 4 is an enlarged transverse sectional view corresponding to the line 4—4 of FIG. 3, FIG. 5 is a sectional view similar to FIG. 4 but showing the outer metal tube with an oval shape and with three standard tubular heaters therein, FIG. 6 is a broken, elevational view of the assemblies of either FIG. 4 or 5, the assembly having been flat-pressed in the center portion, FIG. 7 is an enlarged transverse sectional view of the element of FIG. 4 after flat pressing, the pressing dies being still in position, and FIG. 8 is a view similar to FIG. 7 but showing the element of FIG. 5 after flat pressing.

DESCRIPTION OF THE PREFERRED EMBODIMENT

The improved electric heating element of our invention is shown herein as adapted for use in a French fryer unit, but the element may be used in many other environments wherein a flat, blade-like active heating portion of a heating unit is desired.

Figure 1:
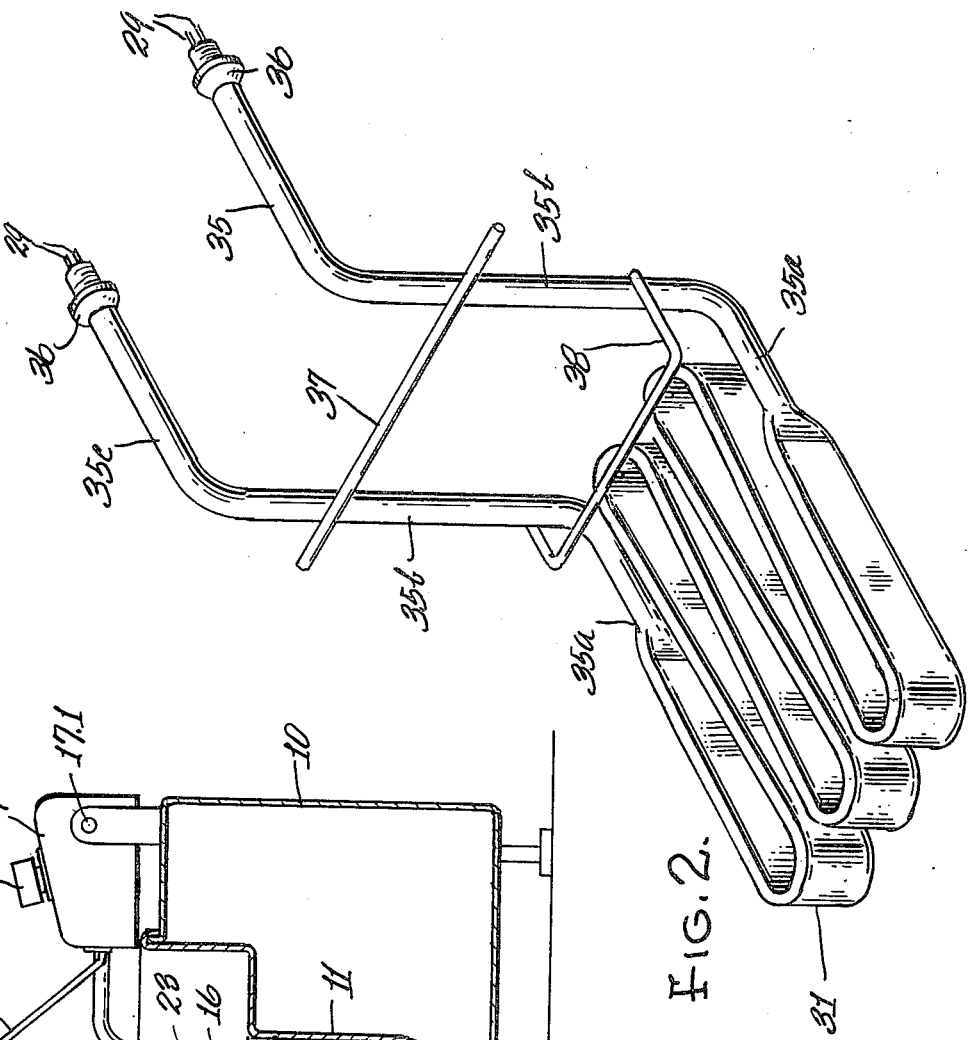
FIG. 1 is a transverse sectional view of a French fryer unit, showing a tubular, metal-sheathed electric heater of the prior art.

As shown in FIG. 1, a conventional deep-fat fryer comprises a housing 10 in which a cooking tank 11 is removably contained. The tank is adapted to contain the cooking oil to a level shown by the numeral 12. An electric heating element 14 is used as a source of heat, the element having an active heating portion 15 disposed within the cooking oil, and a terminal portion 16 outside of the oil and connected to a console 17 adapted to contain the temperature controls (not shown) regulated by a control knob 18. The console 17 is hinged at 17.1 to the housing 10 so that the heating element may be swung upwardly and out of the oil.

The fry unit includes a wire basket 19 to contain the food to be fried, the basket having a handle 20 by which it may be lifted from the oil. The basket may have a hook 21 adapted to engage over a loop 22 to suspend the basket 19 out of the oil, the heating element having a cross bar 23 against which the basket may bear in its suspended position. In the fryer unit disclosed in FIG. 1, the heater is provided with rails 24 to support the basket in its position within the oil.

Our invention makes it possible to provide an electric heater for a fry unit of the type shown in FIG. 1, or for many other uses, wherein high wattage is required and wherein the heater has a blade-like active heating portion, of a sinuous shape and with a flat cross section.

As before mentioned, standard tubular, metal-sheathed electric elements comprise part of the assembly of our improved unit. Such heating elements are shown in FIGS. 3, 4, and 5 and are designated by the reference numeral 25. The elements are the same and include a metal sheath 26, round in cross section and of appropriate length. A helically-coiled resistance wire 27 extends longitudinally with the sheath and is held centered of, and insulated from, the sheath by compacted granular refractory material 28. Metal terminal pins 29 are mechanically and electrically connected to opposite ends of the resistance wire 27 and extend outwardly of the opposite ends of the sheath, through the refractory and through mica end bushings 30.

In FIGS. 3 and 4, two heating elements 25 are disposed within a metal tube 31 which is round in cross section and this assembly is adapted for single phase use. As seen in FIG. 3, the elements 25 are slightly longer than the tube 31 and, as seen in FIG. 4, loosely fit within the interior of the tube 31. As an example of specific construction, the sheath of each of the elements 25 may be of Incaloy, straight in longitudinal extent, and having an outside diameter of 0.260 inches (about 6.735 millimeters). The sheath may be formed of any other suitable metal.

The tube 31 may be of plain cold rolled steel and nickelplated, or it may be a steel alloy or stainless steel. The tube may have an outside diameter of 0.6875 inches (about 17.46250 millimeters) with a wall thickness of about 0.035 inches (about 1.170 millimeters). When the elements 25 are properly disposed within the tube 31, as suggested in FIG. 3, the tube 31 is subjected to a side pressing operation to flatten the assembly to the condition shown in FIG. 7, wherein the long, now flat, transverse walls of the elements 25 are in intimate contact with the adjoining flat inner surfaces of the tube. The flattening operation is only performed on selected linear portions of the assembly; in the case of a fry unit, the portion intermediate to the opposite ends. It is preferred that the outer tube 31 and the elements 25 therein be subjected to an annealing operation before side pressing.

Figure 2:
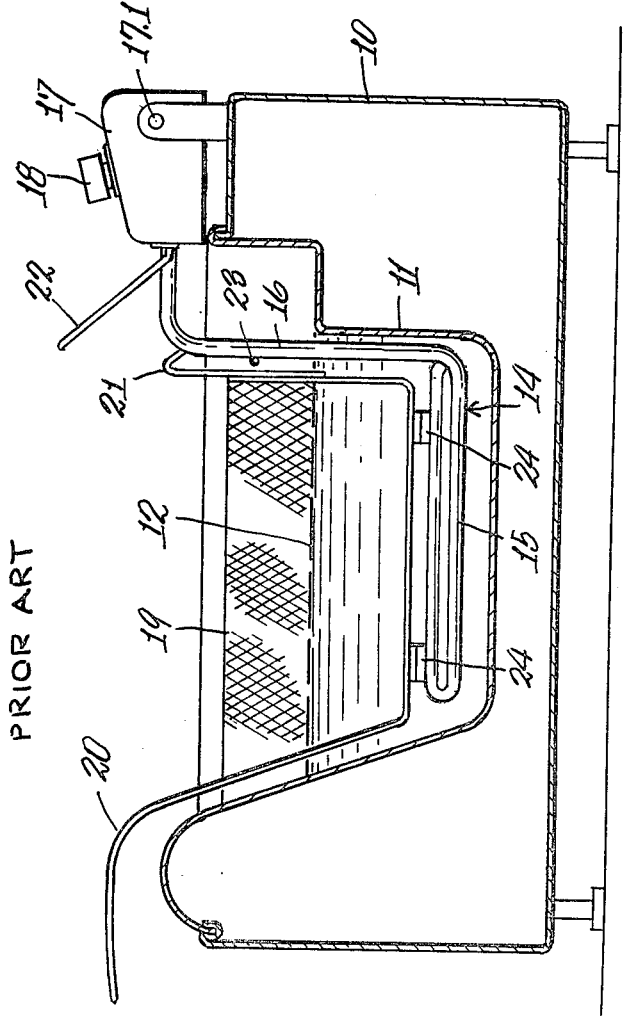
FIG. 2 is a perspective view of a heater according to our invention, and adapted to replace the heater shown in FIG. 1.

After the side pressing, the assembly is preferably subjected to another annealing operation, and thereafter bent to produce the shape required by a user. In the embodiment particularly disclosed herein, the side pressed portion of the assembly is shaped to serpentine formation, as seen in FIG. 2 to produce side-by-side active heating portions that are flat in cross section to provide a large surface area in contact with the cooking oil. The flat section is disposed in upright relation so that the upright movement of oil by convection wipes across the largest surface area.

The ends of the assembly (for fryer use) are left round and extend laterally, as at 35a, then upright as at 35b, and then again laterally, as at 35c. It is preferable to side press the round portions of the assembly sufficiently to snugly contain the two elements 25 within the tube 31. Fittings 36 are attached to the extremities of the portions 35c so that these portions may be connected to a console 17 (FIG. 1) or to any other desired support. The pair of terminal pins extending from each end of the tube 31 may be connected together and to electrical circuitry within the console 17 for single phase operation. A rod 37, like the rod 23 of FIG. 1, may be welded or brazed to position crosswise of the leg portions 35b and a U-shaped support rod 38 may be welded crosswise of the leg portions 35i at a position below the rod 37.

For three-phase construction, three elements 25, identical to those before described, are inserted into a tube 40. This tube may have the same dimensions and metallurgy as the tube 31. In order to fit the three elements within the tube 40, the latter may be shaped to oval cross section, as seen in FIG. 5. The assembly is subjected to annealing and side pressing similar to those described in connection with the assembly shown in FIGS. 3 and 4. As seen in FIG. 8, the three elements 25, after side-pressing, are closely contained within the outer tube 40. The side-pressing dies 41, 42 of both flattening operations are the same, and are shown in cross section in FIGS. 7 and 8.

In the construction of FIGS. 5 and 8, three terminal pins will extend out of the ends (same type of ends as shown at 35c in FIG. 2). The three terminal pins are not electrically connected together but rather are connected to a three-phase 240-volt circuit.

For even higher temperatures, three heating elements like the elements 25 may be disposed within a metal outside tube, these elements having a larger outside diameter (0.315 inches, about 8 millimeters). The assembly is side-pressed, as before, and the final product is adapted to be connected to a three-phase 240- or 480-volt source of electrical energy. To avoid spaces between flattened elements 25 as seen in FIG. 7, the outer tube 31 may be of reduced cross section, and ovalled. Or, the assembly may be side-pressed to a thinner cross section with wider flat sides.

We claim:

1. An electric heater assembly comprising:
an elongated outer metal tube,
a plurality of tubular electric heating elements, each of a transverse size smaller than the opening through said outer tube, and each comprising an elongated metal sheath, a resistance conductor extending longitudinally within said sheath, thermally-conductive material supporting said resistance conductor within said sheath in manner electrically insulated therefrom, and terminal pins attached to opposite ends of said resistance conductor and extending outwardly of opposite ends of said sheath,
said tubular heating elements being disposed longitudinally within said outer tube in a side-by-side relation and held therein and in good heat-transfer relation therewith by tranverse deformation of said outer tube and said tubular heating elements sufficient to force a substantial portion of the outer surface of the sheaths of said heating elements into metal-to-metal contact with a substantial portion of the inner surface of said outer tube throughout at least a portion of their coextensive lengths, said outer tube being of transverse section which is curvilinear in shape and said transverse deformation changing the transverse shape of said outer tube to an oblong shape and the cross section of said tubular elements to complementary oblong shape.

2. The assembly according to claim 1 wherein said outer tube is round in transverse section and
wherein two tubular heating elements are disposed within said outer tube and constructed and arranged for single phase energization.

3. The assembly according to claim 1 wherein said outer tube is oval in transverse section and
wherein three tubular heating elements are disposed within said outer tube and constructed and arranged for three phase energization.

4. The assembly according to claim 1 wherein said transverse deformation flattens said outer tube to a transverse shape having opposite flat surfaces joined by curved ends.

5. An electric heater assembly comprising:
an elongated outer metal tube,
a plurality of tubular electric heating elements, each of a transverse size smaller than the opening through said outer tube, and each comprising an elongated metal sheath, a resistance conductor extending longitudinally within said sheath, thermally-conductive material supporting said resistance conductor within said sheath in manner electrically insulated therefrom, and terminal pins attached to opposite ends of said resistance conductor and extending outwardly of opposite ends of said sheath,
said tubular heating elements being disposed longitudinally within said outer tube in a side-by-side relation and held therein and in good heat-transfer relation therewith by transverse deformation of said outer tube and said tubular heating elements sufficient to force a substantial portion of the outer surface of the sheaths of said heating elements into metal-to-metal contact with a substantial portion of the inner surface of said outer tube throughout at least a portion of their coextensive lengths said transverse deformation flattening said outer tube to a transverse shape having opposite inner flat surfaces joined by curved ends, and said transverse deformation also flattening the sheath of each of said heating elements to a transverse shape having opposite flat outer surfaces, the opposite flat outer surfaces of said heating element sheaths being in metal-to-metal engagement with the opposite flat inner surfaces of said outer tube.

6. The assembly according to claim 5 wherein two tubular heating elements are disposed within said outer tube in side-by-side relation, the opposed flat outer surfaces of each being joined by curved end walls, the latter being out of engagement with the curved end walls of said outer tube.

7. The assembly according to claim 5 wherein three tubular heating elements are disposed within said outer tube in side-by-side relation, the intermediate heating element being compressed to a transverse shape having opposite flat surfaces and opposite flat ends, and the heating elements on either side of said intermediate element being compressed to a transverse shape having a flat end in metal-to-metal engagement with a respective flat end of said intermediate element and a curved end in metal-to-metal engagement with respective curved end walls of said outer tube.

8. An electric heater assembly adapted for use as a heating element for a deep fat fryer having a well for cooking oil and a console, comprising:

an elongated outer metal tube, a plurality of tubular electric heating elements, each of a transverse size smaller than the opening through said outer tube, and each comprising an elongated metal sheath, a resistance conductor extending longitudinally within said sheath, thermally-conductive material supporting said resistance conductor within said sheath in manner electrically insulated therefrom, and terminal pins attached to opposite ends of said resistance conductor and extending outwardly of opposite ends of said sheath, said tubular heating elements being disposed longitudinally within said outer tube in a side-by-side relation and held therein and in good heat-transfer relation therewith by transverse deformation of said outer tube and said tubular heating elements sufficient to force a substantial portion of the outer surface of the sheaths of said heating elements into metal-to-metal contact with a substantial portion of the inner surface of said outer tube throughout at least a portion of their coextensive lengths said transverse deformation being located intermediate to the ends of said outer tube to form a long blade-like portion, the latter being bent to a sinuous generally flat formation to provide an active heating section which is adapted to be immersed in the cooking oil of the fryer, the undeformed end portions at the opposite ends of said active heating section extending vertically and then laterally from said sinuous formation and adapted to be attached to the console of the deep fat fryer.

9. The assembly according to claim 8 wherein a metal rod extends crosswise of said vertically-extending ends and is connected thereto.

* * * * *

UNITED STATES PATENT AND TRADEMARK OFFICE
CERTIFICATE OF CORRECTION

PATENT NO. : 4,468,556
DATED : August 28, 1984
INVENTOR(S) : Donald M. Cunningham and John C. Stover It is certified that error appears in the above—identified patent and that said Letters Patent is hereby corrected as shown below:

Column 2, line 44 "with" should be "within"

Column 3, line 36, "35i" should be "35b"

Signed and Sealed this

Fifth Day of March 1985

[SEAL]

Attest:

DONALD J. QUIGG

Attesting Officer     Acting Commissioner of Patents and Trademarks